United States Patent
Hirata

(10) Patent No.: US 9,111,505 B2
(45) Date of Patent: Aug. 18, 2015

(54) LIQUID CRYSTAL DISPLAY DEVICE AND DRIVE METHOD FOR LIQUID CRYSTAL PANEL

(75) Inventor: Mitsuaki Hirata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 27 days.

(21) Appl. No.: 14/345,010

(22) PCT Filed: Sep. 13, 2012

(86) PCT No.: PCT/JP2012/073531
§ 371 (c)(1),
(2), (4) Date: Mar. 14, 2014

(87) PCT Pub. No.: WO2013/042613
PCT Pub. Date: Mar. 28, 2013

(65) Prior Publication Data
US 2015/0042693 A1 Feb. 12, 2015

(30) Foreign Application Priority Data
Sep. 20, 2011 (JP) .................. 2011-205172

(51) Int. Cl.
*G09G 3/36* (2006.01)
*G02F 1/1362* (2006.01)

(52) U.S. Cl.
CPC ............ *G09G 3/3659* (2013.01); *G09G 3/3607* (2013.01); *G09G 3/3614* (2013.01); *G09G 3/3666* (2013.01); *G02F 1/136286* (2013.01); G09G 2300/0426 (2013.01); G09G 2300/0439 (2013.01); G09G 2300/0478 (2013.01); G09G 2300/0876 (2013.01); G09G 2310/0202 (2013.01); G09G 2310/0221 (2013.01); G09G 2320/0233 (2013.01); G09G 2320/0247 (2013.01)

(58) Field of Classification Search
CPC . G09G 3/3659; G09G 3/3607; G09G 3/3614; G09G 3/3666; G09G 2300/0426; G09G 2300/0439; G09G 2300/0478; G09G 2300/0876; G09G 2310/0202; G09G 2310/0221; G09G 2320/0233; G09G 2320/0247; G02F 1/136286
USPC ............................ 345/89, 204–214, 690–699
See application file for complete search history.

(56) References Cited

U.S. PATENT DOCUMENTS

| 6,552,706 | B1 * | 4/2003 | Ikeda et al. ...................... 345/96 |
| 2005/0122441 | A1 * | 6/2005 | Shimoshikiryoh ............. 349/38 |

(Continued)

FOREIGN PATENT DOCUMENTS

WO 2009/084331 A1 7/2009

OTHER PUBLICATIONS

Official Communication issued in International Patent Application No. PCT/JP2012/073531, mailed on Nov. 20, 2012.

*Primary Examiner* — Dmitriy Bolotin
(74) *Attorney, Agent, or Firm* — Keating & Bennett, LLP

(57) ABSTRACT

A liquid crystal display device of the present invention employs a liquid crystal panel of CS control pixel division, and is configured such that two adjacent pixel rows share one retention capacitor wire, and two adjacent scanning signal lines are simultaneously selected. In a case where two pixels ((Pn+1) and (Pn+2)) which are adjacent along a scanning direction but are not simultaneously selected are to have an identical predetermined luminance in two frames, a first signal potential is written to one pixel (Pn+1) in one of the two frames and a second signal potential having a polarity identical to that of the first signal potential is written to the other pixel (Pn+2) in the other of the two frames, the first and second signal potentials are different from each other. The present invention makes it possible to suppress transverse lines of display unevenness which occur in the liquid crystal display device.

10 Claims, 19 Drawing Sheets

(56) References Cited

U.S. PATENT DOCUMENTS

| | | | |
|---|---|---|---|
| 2006/0044241 A1* | 3/2006 | Yuh-Ren et al. | 345/89 |
| 2007/0030233 A1* | 2/2007 | Chai et al. | 345/98 |
| 2007/0132684 A1* | 6/2007 | Baek et al. | 345/87 |
| 2008/0068524 A1* | 3/2008 | Kim | 349/38 |
| 2008/0106660 A1* | 5/2008 | Kitayama et al. | 349/39 |
| 2008/0218465 A1* | 9/2008 | Tsou et al. | 345/92 |
| 2009/0002585 A1* | 1/2009 | Shimoshikiryoh et al. | 349/39 |
| 2009/0268110 A1* | 10/2009 | Kitayama et al. | 349/37 |
| 2010/0253668 A1 | 10/2010 | Sugihara et al. | |
| 2013/0009941 A1* | 1/2013 | Hwang et al. | 345/212 |
| 2013/0235006 A1* | 9/2013 | Shin et al. | 345/204 |

* cited by examiner

F I G. 1
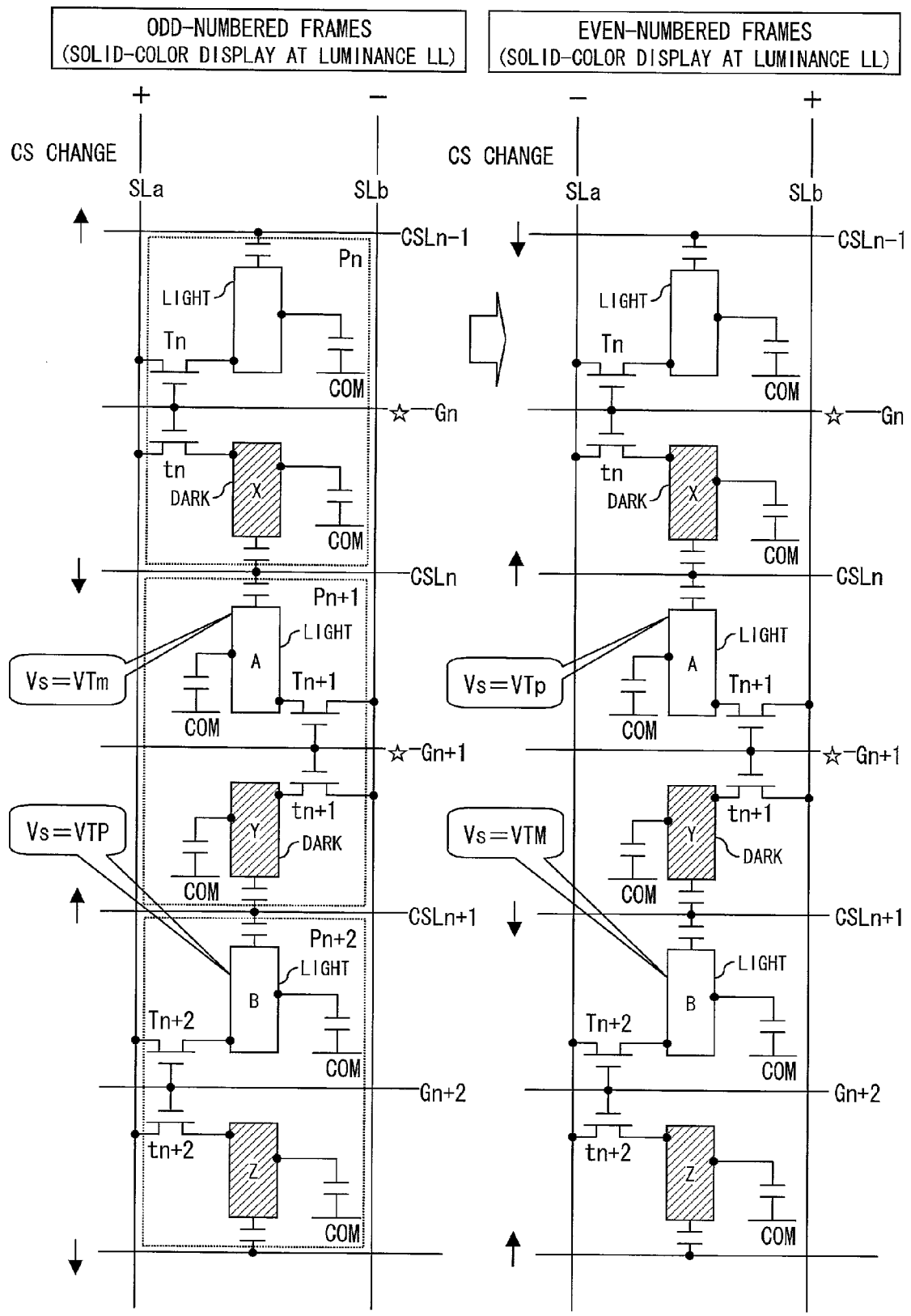

F I G. 4
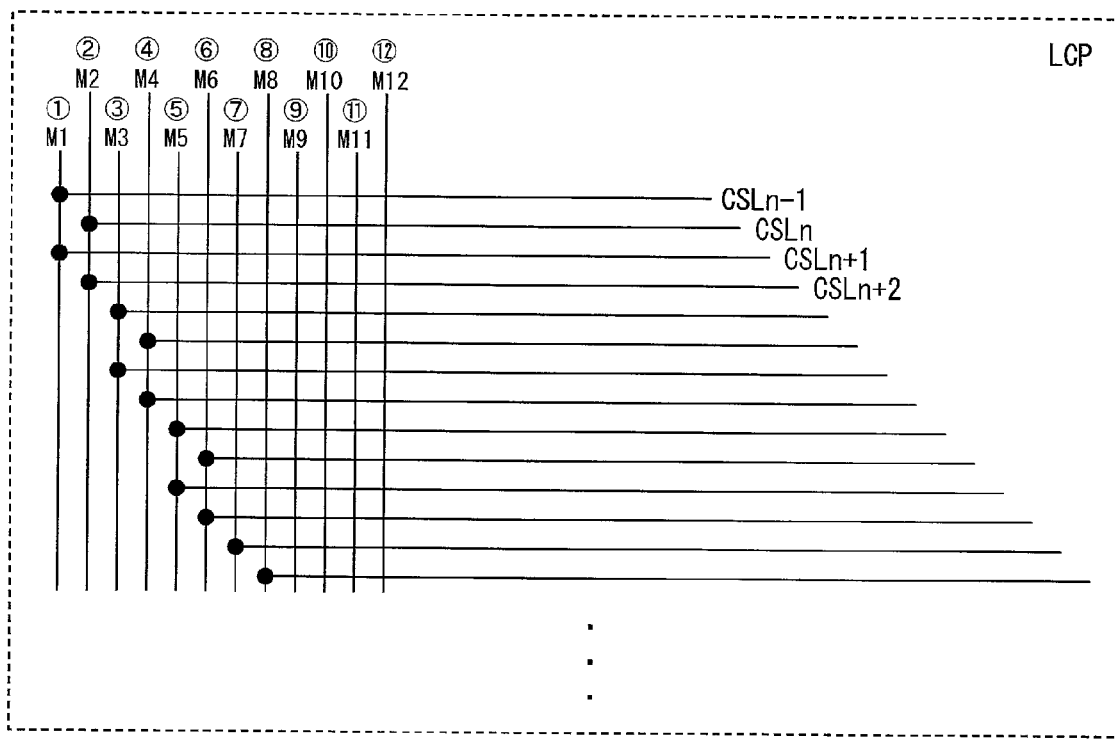

FIG. 7
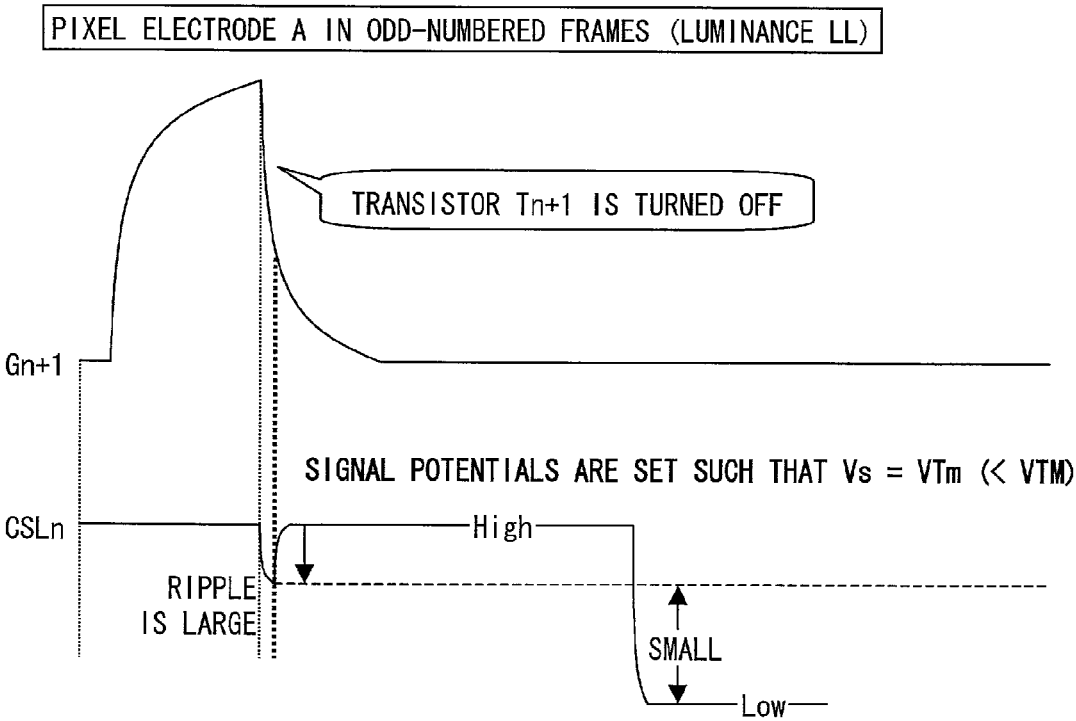
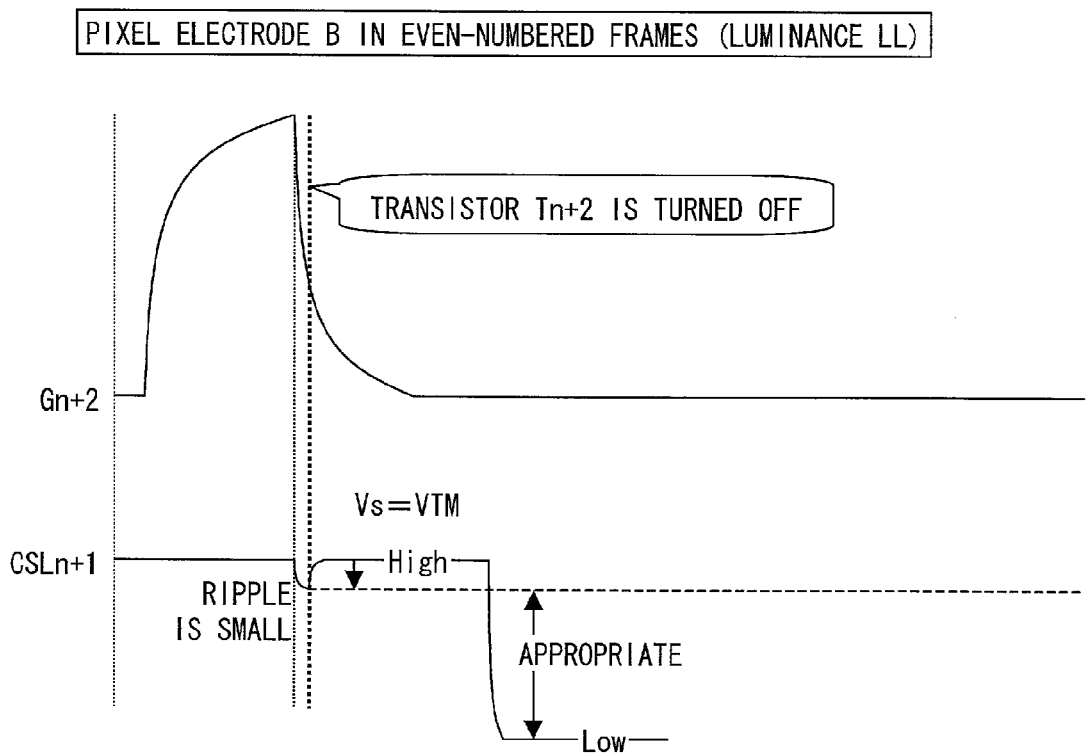

F I G. 8
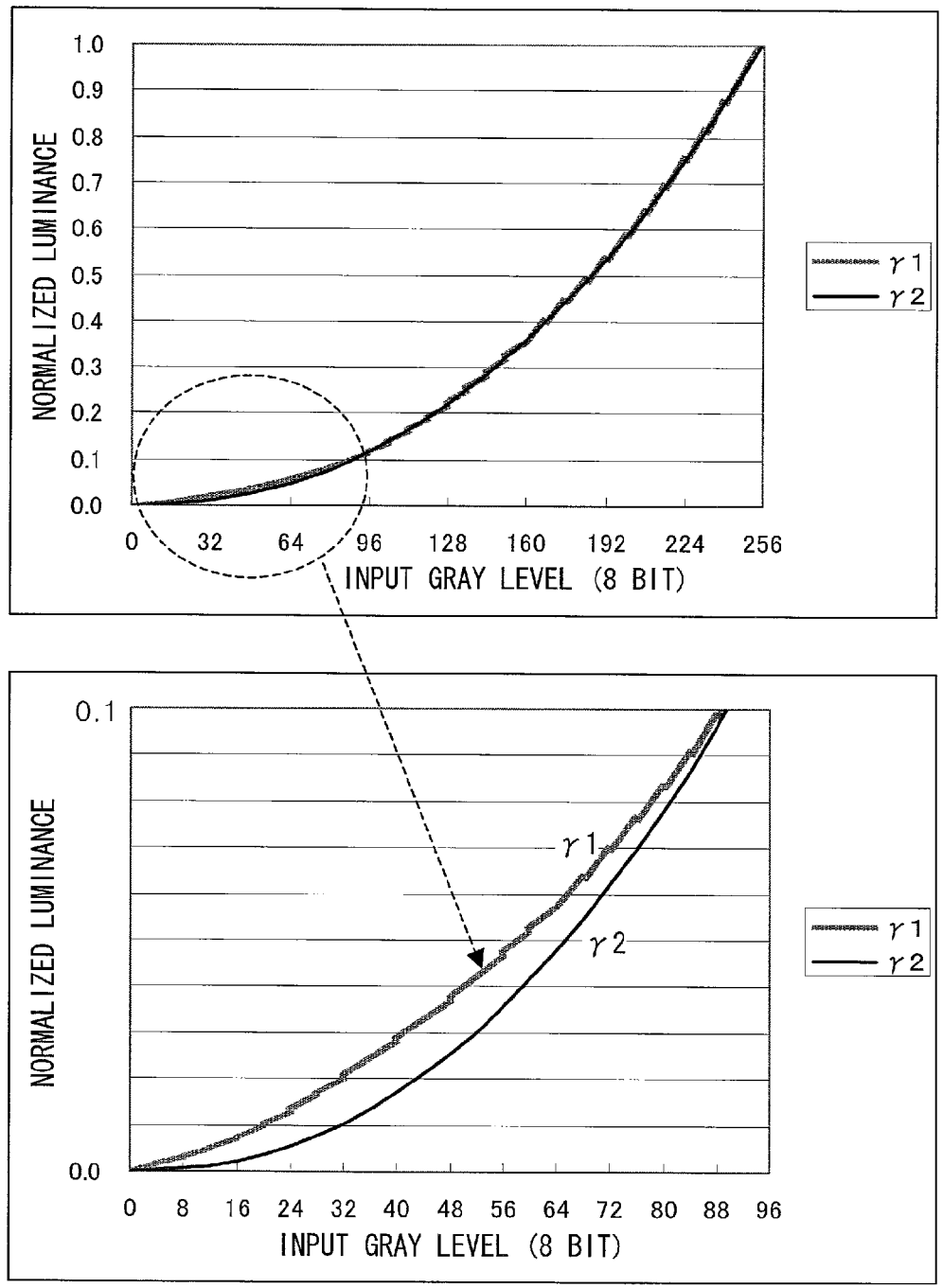

FIG. 9
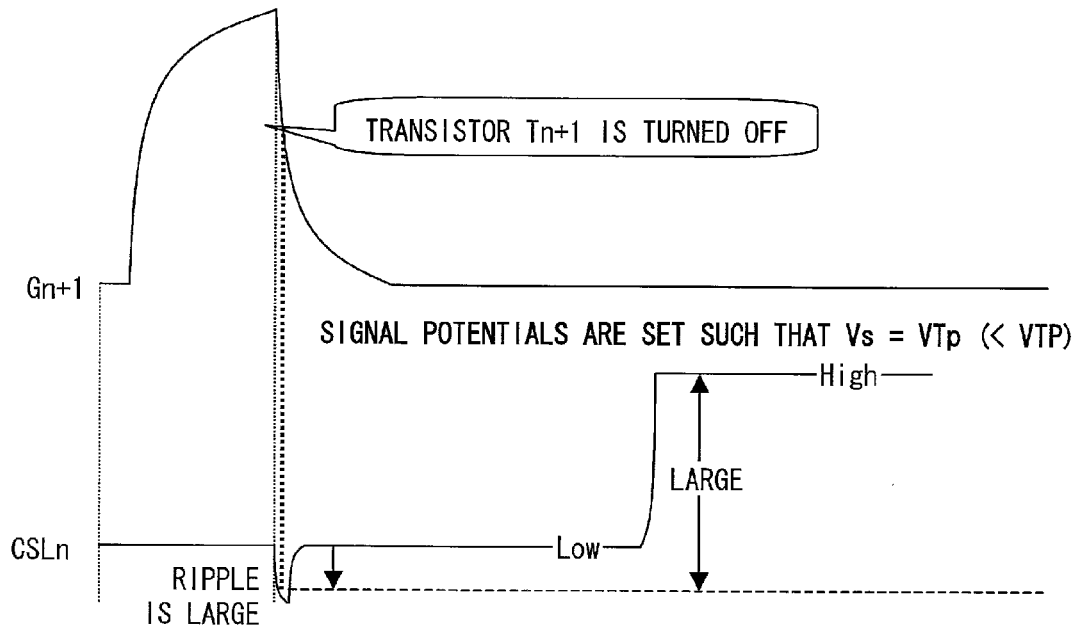
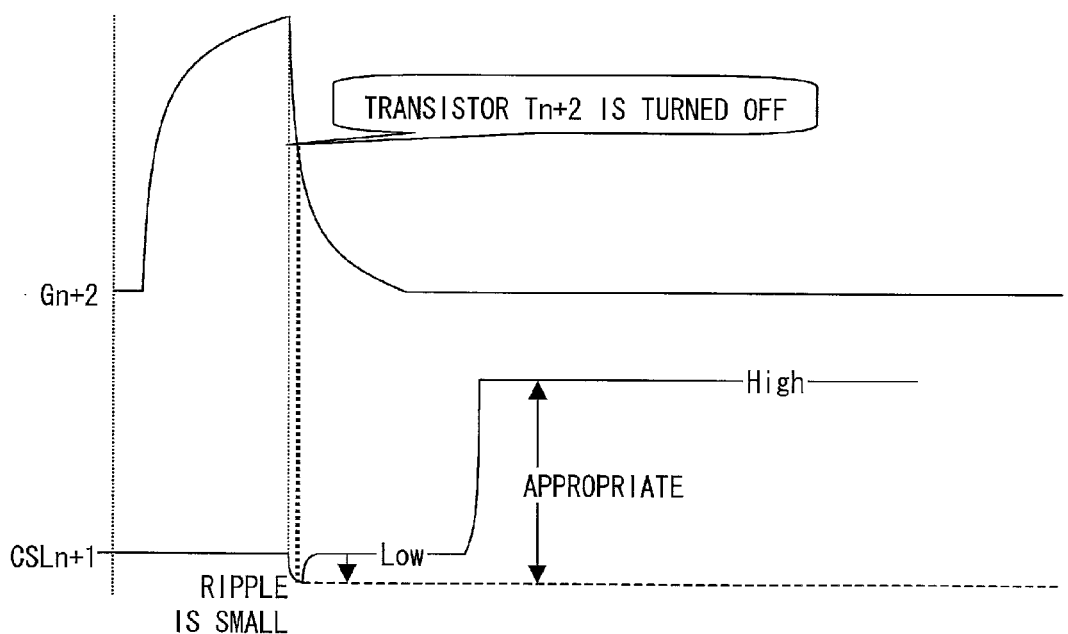

FIG. 10
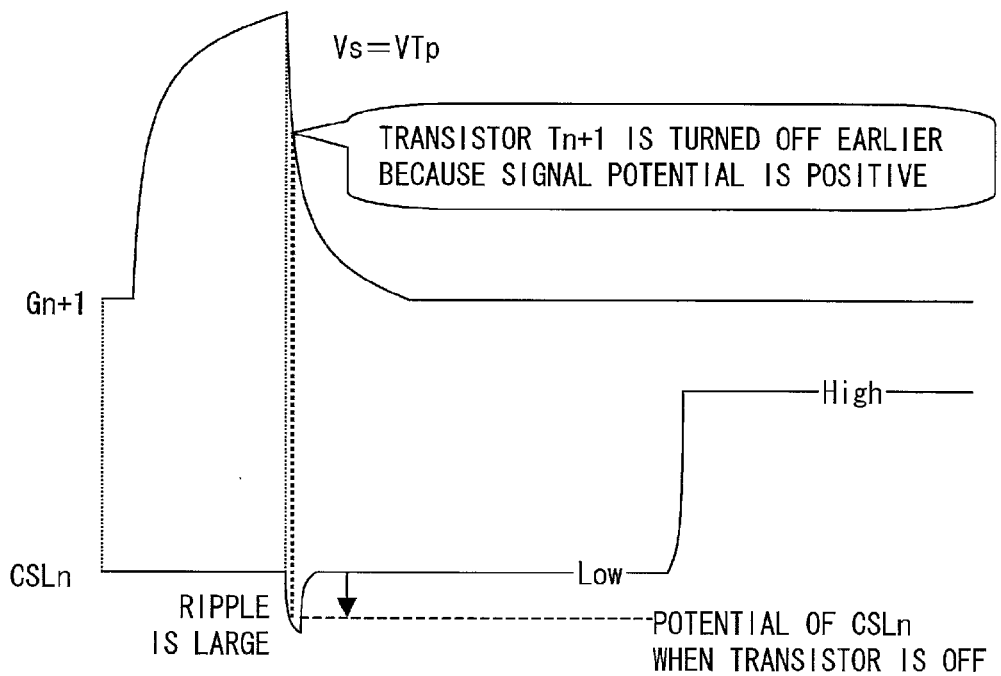
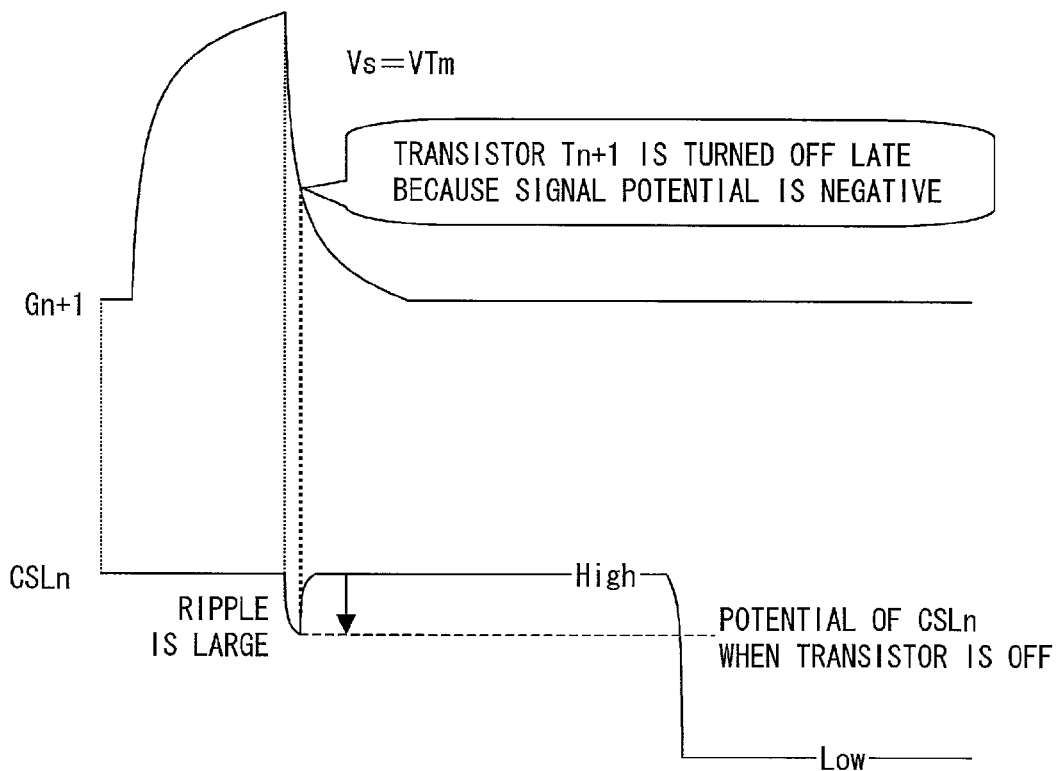

F I G. 1 2
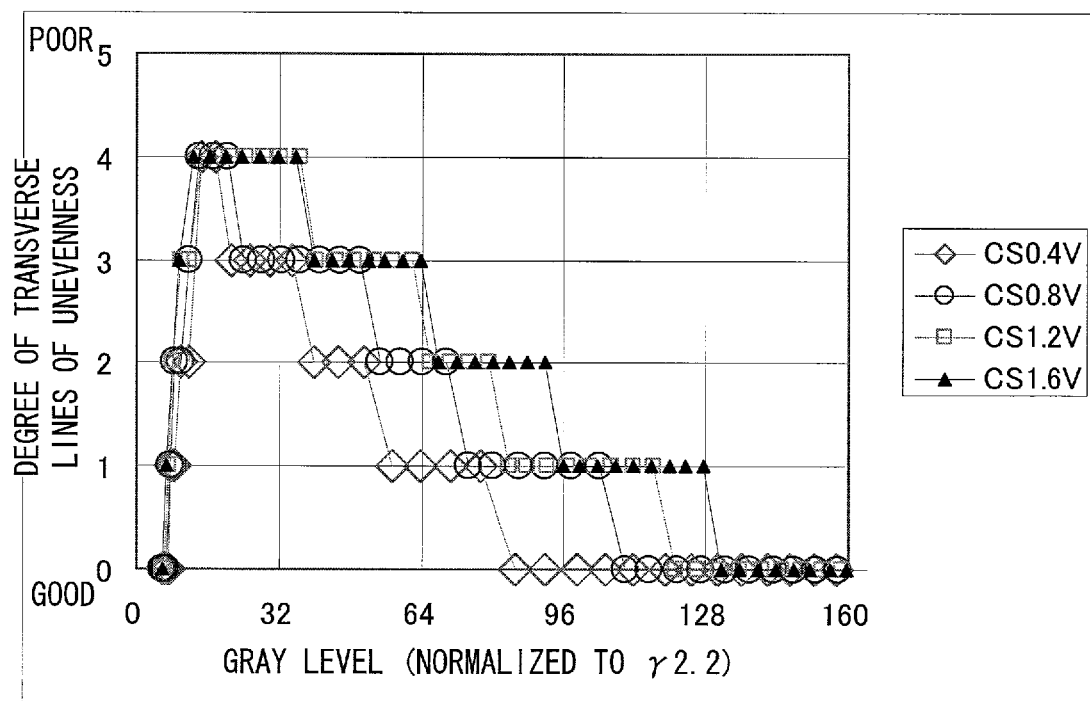

FIG. 19
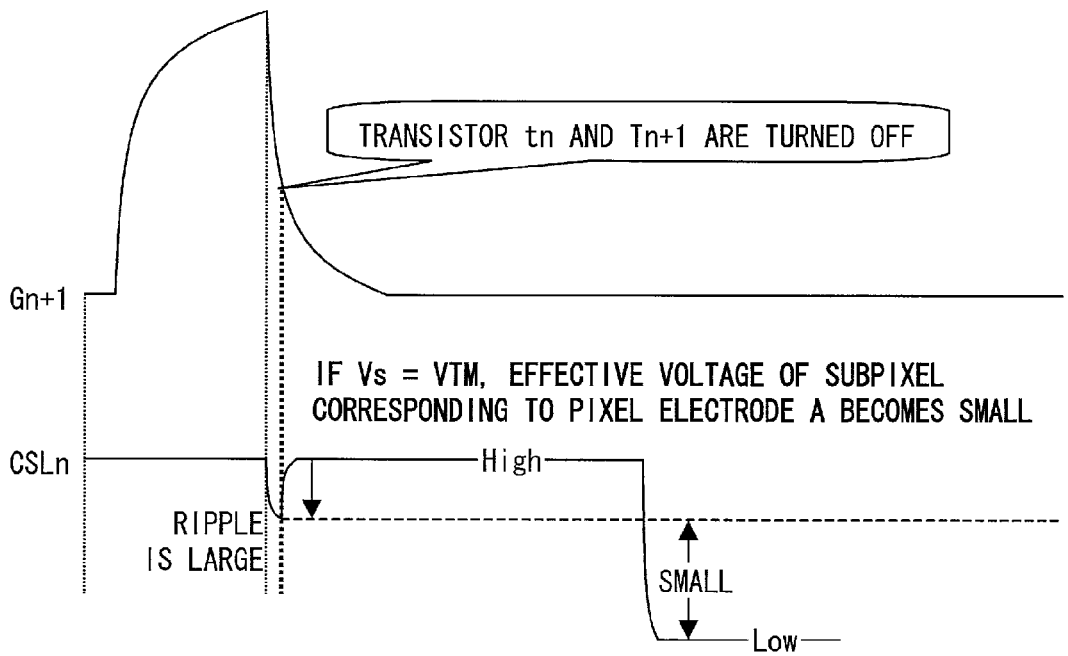
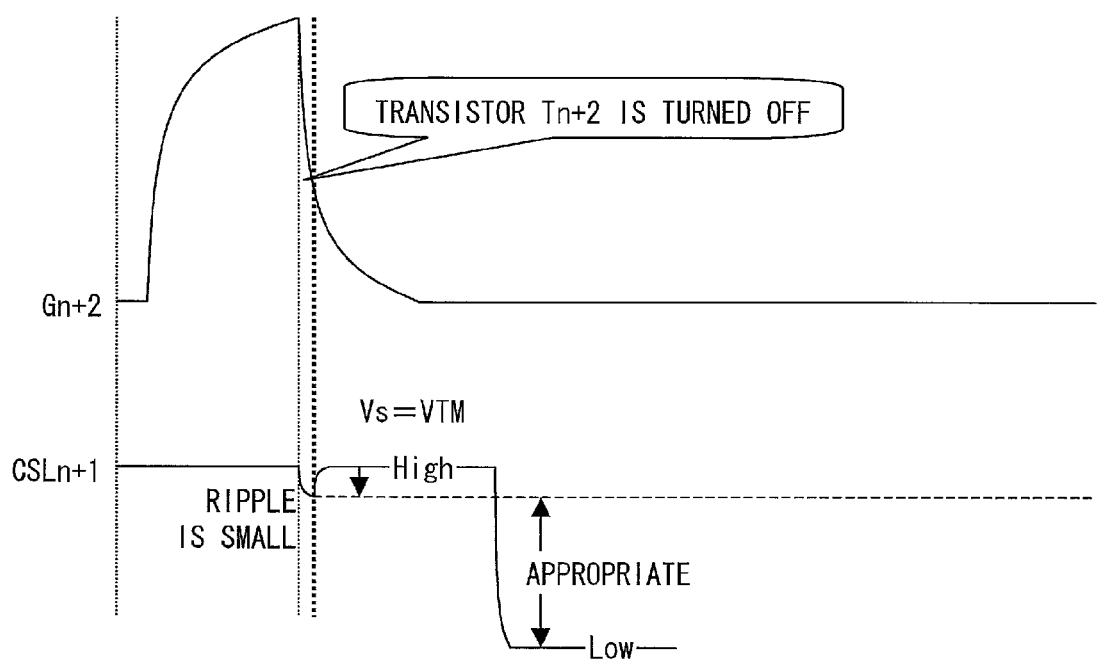

LIQUID CRYSTAL DISPLAY DEVICE AND DRIVE METHOD FOR LIQUID CRYSTAL PANEL

TECHNICAL FIELD

The present invention relates to a driving technique for a liquid crystal panel.

BACKGROUND ART

Patent literature 1 discloses the following technique (pixel division driving): two pixel electrodes are provided in one pixel (corresponding to one primary color) of a liquid crystal panel; and when halftone is displayed, these two pixel electrodes are caused to have respective different luminances by controlling potentials of CS wires. This pixel division driving improves viewing angle characteristics of the liquid crystal panel.

Patent Literature 1 also discloses the following technique (two-lines simultaneous selection driving): two signal potential lines are provided for one pixel column; and two adjacent scanning signal lines are simultaneously selected. This two-lines simultaneous selection driving allows fast scan of the liquid crystal panel.

CITATION LIST

Patent Literature

Patent Literature 1
PCT International Application Publication No. WO2009/084331 (A1)

SUMMARY OF INVENTION

Technical Problem

The inventor found that flicker and transverse lines of display unevenness are often perceivable if the pixel division driving and the two-lines simultaneous selection driving are employed in a liquid crystal panel in which one CS wire is shared by two adjacent pixel rows (see Patent Literature 1). One of objects of the present invention is to prevent such flicker and transverse lines of display unevenness.

Solution to Problem

A liquid crystal display device of the present invention includes: a first scanning signal line, a second scanning signal line, a third scanning signal line, and a fourth scanning signal line which are arranged in order; a first pixel, a second pixel, a third pixel, and a fourth pixel connected to the first scanning signal line, the second scanning signal line, the third scanning signal line, and the fourth scanning signal line, respectively; and a first retention capacitor wire and a second retention capacitor wire, wherein the first to fourth pixels each include a plurality of pixel electrodes, the first and second pixels with the first retention capacitor wire form capacitors, and the second and third pixels with the second retention capacitor wire form capacitors, the first and second scanning signal lines are simultaneously selected and thereafter the third and fourth scanning signal lines are simultaneously selected, potentials of the first and second retention capacitor wires are separately controlled, the second pixel and the third pixel have the same color, and in a case where the second and third pixels are to have an identical predetermined luminance in two frames, a first signal potential is written to the second pixel in one of the two frames and a second signal potential having a polarity identical to that of the first signal potential is written to the third pixel in the other of the two frames, the first and second signal potentials being different from each other.

With this arrangement, signal potentials written to pixels compensate for a difference between the degrees of ripples which occur in the first and second retention capacitor wires. Accordingly, it is possible to suppress transverse lines of display unevenness.

Advantageous Effects of Invention

As described above, the present invention makes it possible to suppress transverse lines of display unevenness.

BRIEF DESCRIPTION OF DRAWINGS

FIG. 1 is a schematic view illustrating a signal potential Vs written to pixels Pn+1 and Pn+2 in Example 1.

FIG. 4 is a schematic view illustrating how retention capacitor wires are connected to stem wires.

FIG. 7 is a set of timing charts each showing a relationship between (i) a signal potential Vs which is written to a pixel electrode A in an odd-numbered frame and (ii) a signal potential Vs which is written to a pixel electrode B in an even-numbered frame in FIG. 1.

FIG. 8 is a set of graphs each showing (i) a relationship between luminance and gray level corresponding to the signal potential Vs (written potential) written to the pixel Pn+1 (γ1 characteristics) and (ii) a relationship between actual luminance and actual gray level of the pixel Pn+1 (γ2 characteristics).

FIG. 9 is a set of timing charts each showing a relationship between (i) the signal potential Vs which is written to the pixel electrode A in an even-numbered frame and (ii) the signal potential Vs which is written to the pixel electrode B in an odd-numbered frame in FIG. 1.

FIG. 10 is a set of timing charts each showing a relationship between (i) the signal potential Vs which is written to the pixel electrode A in an even-numbered frame and (ii) the signal potential Vs which is written to the pixel electrode A in an odd-numbered frame in FIG. 1.

FIG. 12 is a graph showing a gray level range and the degree of display unevenness for each amplitude of a potential of a retention capacitor wire.

FIG. 19 is a set of timing charts each showing a relationship between (i) a signal potential Vs which is written to a pixel electrode A in an odd-numbered frame and (ii) a signal potential Vs which is written to a pixel electrode B in an even-numbered frame in FIG. 18.

DESCRIPTION OF EMBODIMENTS

Example 1

Figure 2:
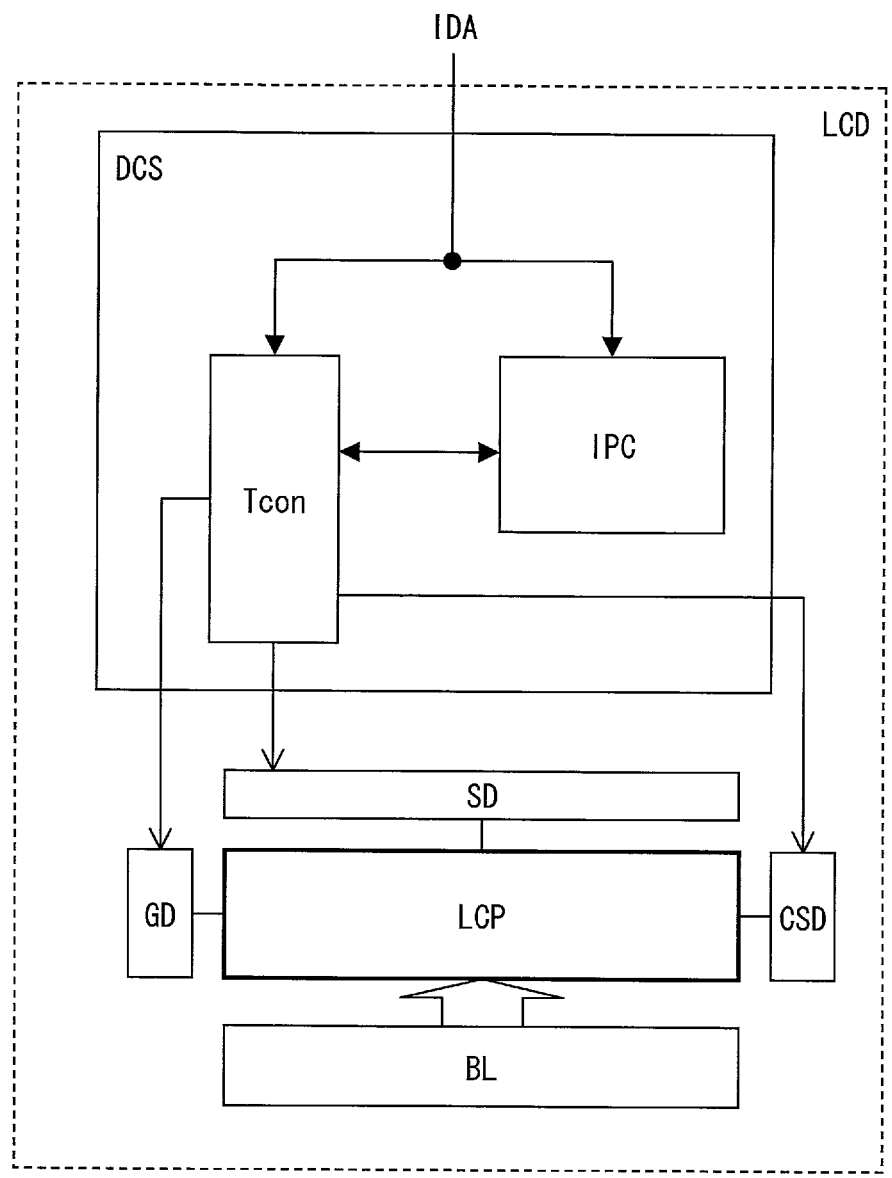
FIG. 2 is a block diagram illustrating an example of a configuration of a liquid crystal display device of Example 1.

As illustrated in FIG. 2, a liquid crystal display device LCD of Example 1 includes (i) a liquid crystal panel LCP including signal potential lines, scanning signal lines, retention capacitor wires (CS wires), transistors and pixel electrodes, (ii) a backlight BL for irradiating the liquid crystal panel LCP with light, (iii) a gate driver GD for driving the scanning signal lines (supplying gate pulses to the scanning signal lines), (iv) a source driver SD for driving the signal potential lines (supplying signal potentials to the signal potential lines), (v) a CS driver CSD for driving the retention capacitor wires (CS wires) (supplying modulated signals to the retention capacitor wires), and (vi) a display control substrate DCS (timing controller substrate) for controlling the gate driver, the source driver and the CS driver.

The display control substrate DCS includes a timing controller Tcon and an image processing circuit IPC. The timing controller Tcon (i) generates display data, a source control signal, a gate control signal, and a CS control signal from image data IDA in cooperation with the image processing circuit IPC and (ii) supplies the display data and the source control signal to the source driver SD, supplies the gate control signal to the gate driver GD, and supplies the CS control signal to the CS driver CSD.

Figure 3:
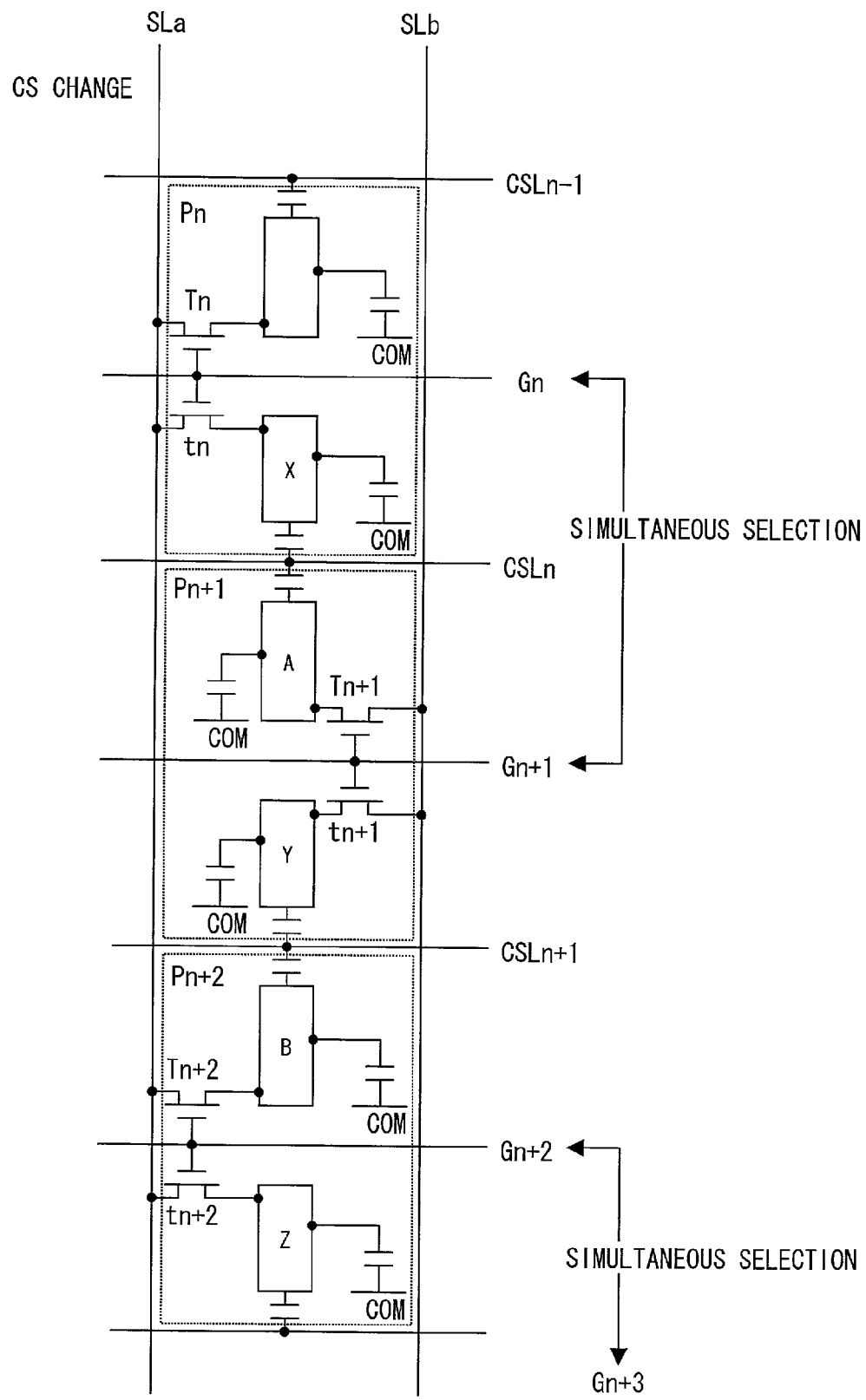
FIG. 3 is a schematic view illustrating an example of a configuration of a liquid crystal panel of Example 1.

The liquid crystal display device of Example 1 is configured such that, as illustrated in FIG. 3, (i) two pixel electrodes are provided in one pixel (corresponding to one primary color) and (ii) two signal potential lines are provided in correspondence with one pixel column. For example, four scanning signal lines Gn to Gn+3 which are adjacent to each other along a scanning direction (column direction) are selected such that (i) first, two scanning signal lines Gn and Gn+1 are simultaneously selected and (ii) next, two scanning signal lines Gn+2 and Gn+3 are simultaneously selected.

Specifically, a pixel electrode A and a pixel electrode Y are provided in a pixel Pn+1, the pixel electrode A is connected to a signal potential line SLb and the scanning signal line Gn+1 via a transistor Tn+1, and the pixel electrode Y is connected to the signal potential line SLb and the scanning signal line Gn+1 via a transistor tn+1. A pixel electrode B and a pixel electrode Z are provided in a pixel Pn+2 (pixel of the same color as the pixel Pn+1) which is adjacent to the pixel Pn+1 along the column direction, the pixel electrode B is connected to a signal potential line SLa and the scanning signal line Gn+2 via a transistor Tn+2, and the pixel electrode Z is connected to the signal potential line SLa and the scanning signal line Gn+2 via a transistor tn+2. Note that a pixel electrode X included in a pixel Pn is connected to the signal potential line SLa and a scanning signal line Gn via a transistor tn.

The liquid crystal display device LCD is configured such that two adjacent pixel rows share one retention capacitor wire. For example, a retention capacitor wire CSLn, with the pixel electrode X of the pixel Pn and the pixel electrode A of the pixel Pn+1, forms retention capacitors, and a retention capacitor wire CSLn+1, with the pixel electrode Y of the pixel Pn+1 and the pixel electrode B of the pixel Pn+2, forms retention capacitors.

Figure 5:
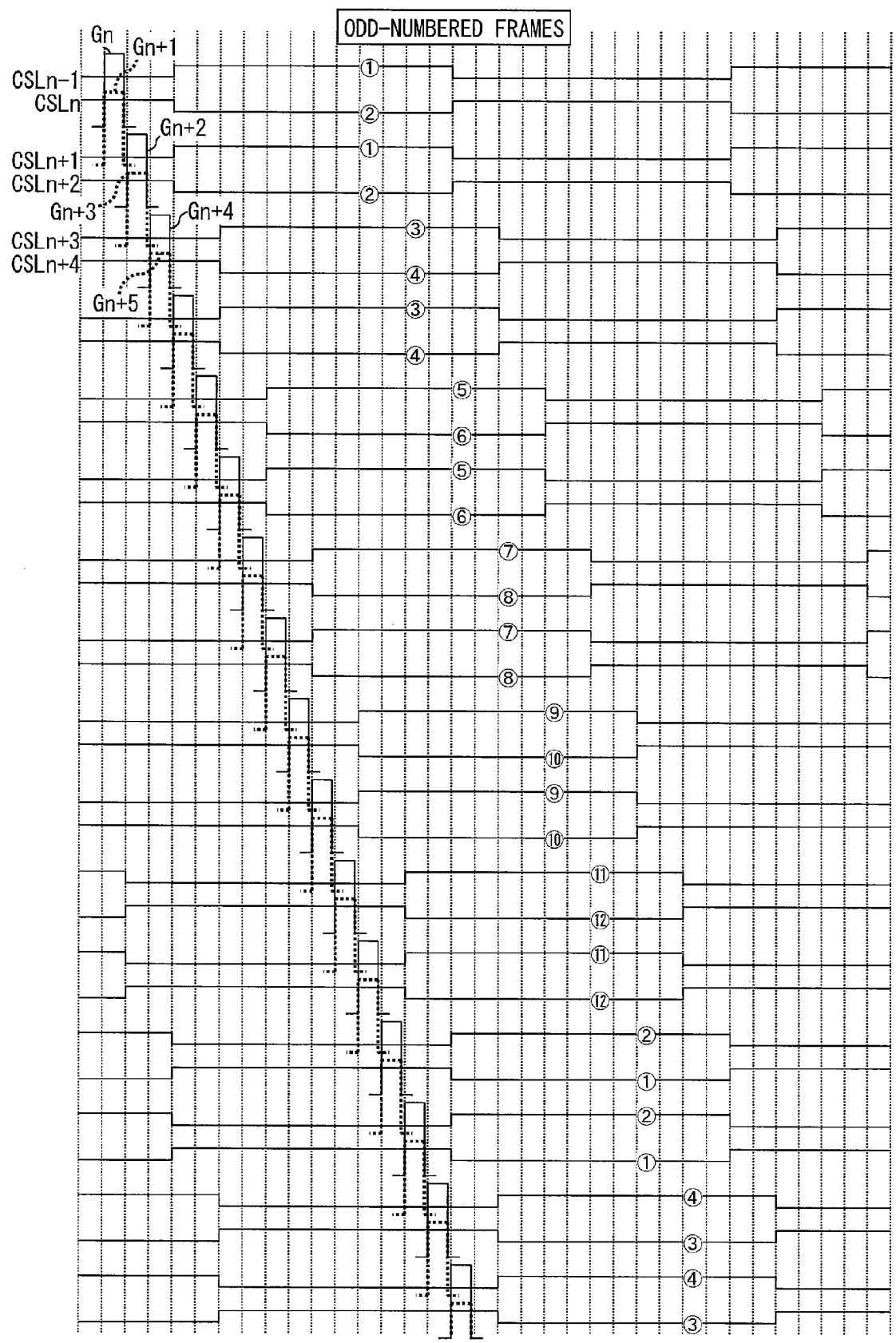
FIG. 5 is a timing chart illustrating a relationship between (i) phases of the retention capacitor wires and (ii) scanning of scanning signal lines in odd-numbered frames.
Figure 6:
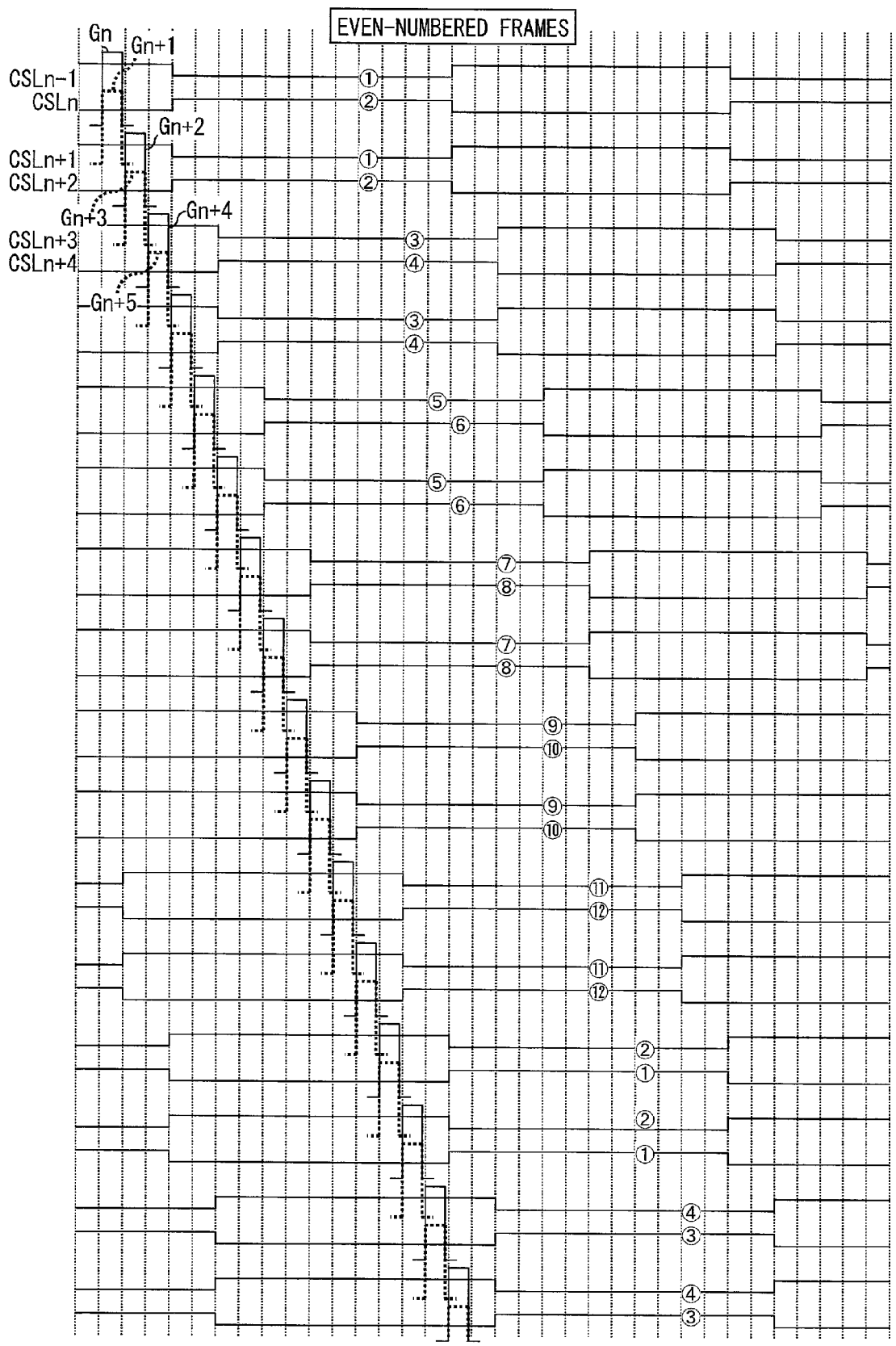
FIG. 6 is a timing chart illustrating a relationship between (i) phases of the retention capacitor wires and (ii) scanning of the scanning signal lines in even-numbered frames.

As illustrated in FIGS. 4 to 6, twelve stem wires M1 to M12 receive, from the CS driver CSD, modulated signals of first to twelfth phases. Each retention capacitor wire is connected to one of the stem wires M1 to M12. Note that the first to twelfth phases each have a cycle of 24 H (horizontal scanning periods), and the phase changes from "High" to "Low" or from "Low" to "High" every 12 H.

As illustrated in FIGS. 1 and 5, the liquid crystal display device of the present example is arranged as below. In odd-numbered frames (solid-color display at a luminance LL), while two scanning signal lines Gn and Gn+1 are both in a selected state, a positive signal potential is written from the signal potential line SLa to the pixel electrode X, and a negative signal potential VTm is written from the signal potential line SLb to the pixel electrode A and the pixel electrode Y. Next, while two scanning signal lines Gn+2 and Gn+3 are both in the selected state, a positive signal potential VTP is written from the signal potential line SLa to the pixel electrode B and the pixel electrode Z. After that, the retention capacitor wire CSLn changes from "High" state to "Low" state while the retention capacitor wire CSLn+1 changes from "Low" state to "High" state. Accordingly, an effective potential of the pixel electrode A becomes lower than VTm (an effective voltage of a subpixel corresponding to the pixel electrode A increases), an effective potential of the pixel electrode Y becomes higher than VTm (an effective voltage of a subpixel corresponding to the pixel electrode Y decreases), and an effective potential of the pixel electrode B becomes higher than VTP (an effective voltage of a subpixel corresponding to the pixel electrode B increases).

Furthermore, as illustrated in FIGS. 1 and 6, in even-numbered frames (solid-color display at a luminance LL), while two scanning signal lines Gn and Gn+1 are both in the selected state, a negative signal potential is written from the signal potential line SLa to the pixel electrode X, and a positive signal potential VTp is written from the signal potential line SLb to the pixel electrode A and the pixel electrode Y. Next, while two scanning signal lines Gn+2 and Gn+3 are both in the selected state, a negative signal potential VTM is written from the signal potential line SLa to the pixel electrode B and the pixel electrode Z. After that, the retention capacitor wire CSLn changes from "Low" state to "High" state while the retention capacitor wire CSLn+1 changes from "High" state to "Low" state. Accordingly, an effective potential of the pixel electrode A becomes higher than VTp (an effective voltage of a subpixel corresponding to the pixel electrode A increases), an effective potential of the pixel electrode Y becomes lower than VTp (an effective voltage of a subpixel corresponding to the pixel electrode Y decreases), and an effective potential of the pixel electrode B becomes lower than VTM (an effective voltage of a subpixel corresponding to the pixel electrode B increases).

According to Example 1, the luminance LL is a low luminance corresponding to a gray level of 0 to 90 of 256 gray levels, and the signal potentials are set such that VTm<VTM and VTp<VTP. The reason therefor is discussed below with reference to FIGS. 1, and 7 to 10, 18 and 19. Furthermore, the signal potentials are set such that (VTp−VTm)>(VTP−VTM). The reason therefor is discussed below with reference to FIGS. 1, 7 and 9 to 11.

The retention capacitor wire CSLn is affected by both a feed-through voltage of the pixel electrode X connected to the transistor to and a feed-through voltage of the pixel electrode A connected to the transistor Tn+1 when the potentials of the scanning signal lines Gn and Gn+1 change from "active (High)" to "non-active (Low)" (when the transistors tn and Tn+1 are turned off) after the simultaneous selection of the scanning signal lines Gn and Gn+1. Therefore, a ripple (downward) which occurs in potential of the retention capacitor wire CSLn when the transistors tn and Tn+1 are turned off is relatively large.

On the other hand, the retention capacitor wire CSLn+1 is affected only by a feed-through voltage of the pixel electrode B connected to the transistor Tn+2 when the potentials of the scanning signal lines Gn+2 and Gn+3 change from "active (High)" to "non-active (Low)" (when the transistor Tn+2 is turned off). Therefore, a ripple (downward) which occurs in potential of the retention capacitor wire CSLn+1 when the transistor Tn+2 is turned off is relatively small.

Such a difference in magnitude of ripples causes two effects on the potentials of pixel electrodes.

Figure 18:
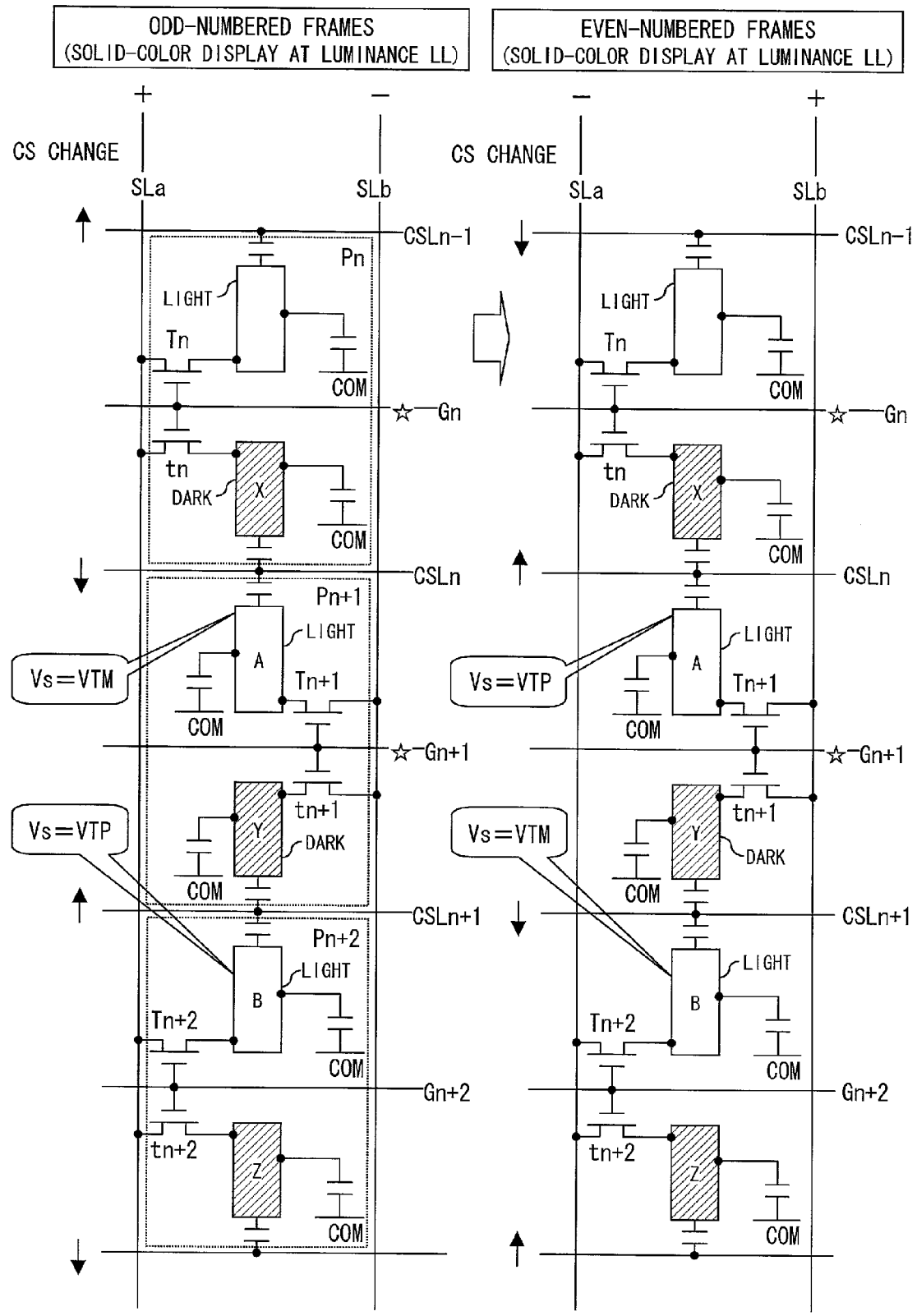
FIG. 18 is a schematic view illustrating a signal potential Vs written to pixels Pn+1 and Pn+2 in Reference Example.

One of the effects is as follows. As illustrated in FIGS. 18 and 19, a difference between the potential of the retention capacitor wire CSLn and the High level when the transistors tn and Tn+1 are turned off in an odd-numbered frame is larger than a difference between the potential of the retention capacitor wire CSLn+1 and the High level when the transistor Tn+2 is turned off in an even-numbered frame. Similarly, a difference between the potential of the retention capacitor wire CSLn and a Low level when the transistors tn and Tn+1 are turned off in an even-numbered frame is larger than a difference between the potential of the retention capacitor wire CSLn+1 and the Low level when the transistor Tn+2 is turned off in an odd-numbered frame.

As a result, a feed-through direct-current component of a pixel electrode relative to the common potential becomes different between pixels connected to the transistors tn and Tn+1 and pixels connected to the transistor Tn+2. Accordingly, effective values change at a frequency that is ½ the frame frequency. This tends to cause flicker.

According to Example 1, as illustrated in FIGS. 1 and 7, when displaying a luminance LL (low luminance corresponding to a gray level of about 0 to 90 of the 256 gray levels) in pixels, it is possible to compensate for the difference between the degree of a ripple which occurs in the retention capacitor wire CSLn and the degree of a ripple which occurs in the retention capacitor wire CSLn+1 because signal potentials are set such that VTm (negative signal potential)<VTM (negative signal potential). Accordingly, it is possible to reduce the difference between the effective voltage across the subpixel corresponding to the pixel electrode A in odd-numbered frames and the effective voltage across the subpixel corresponding to the pixel electrode B in even-numbered frames. This makes it possible to prevent flicker which is caused when the effective values change every frame.

According to Example 1, as illustrated in FIGS. 1 and 9, when displaying a luminance LL (low luminance corresponding to a gray level of about 0 to 90 of the 256 gray levels) in pixels, it is possible to compensate for the difference between the degree of a ripple which occurs in the retention capacitor wire CSLn and the degree of a ripple which occurs in the retention capacitor wire CSLn+1 because signal potentials are set such that VTp (positive signal potential)<VTP (positive signal potential). Accordingly, it is possible to reduce the difference between the effective voltage across the subpixel corresponding to the pixel electrode A in even-numbered frames and the effective voltage across the subpixel corresponding to the pixel electrode B in odd-numbered frames. This makes it possible to prevent flicker which is caused when the effective values change every frame.

The other effect occurs when gate pulses (scanning signals) are turned off, because pixels (transistors provided in the pixels) are turned off at slightly different times depending on the polarities of the signal potentials. Specifically, pixels which have received a positive signal potential are turned off one to several microseconds earlier than transistors of pixels which have received a negative signal potential (see FIGS. 10 and 11).

Even during this period (from when the pixels which have received the positive signal potential are turned off to when the pixels which have received the negative signal potential are turned off), CS potentials change due to the effect of ripples. Therefore, the potentials of the pixel electrodes vary depending on the polarities of the signal potentials.

Specifically, when the following two differences are compared, i.e., when the difference between the potential of the retention capacitor wire CSLn and the Low level when the transistor Tn+1 is turned off in an even-numbered frame is compared with the difference between the potential of the retention capacitor wire CSLn and the High level when the transistor Tn+1 is turned off in an odd-numbered frame, the difference in the odd-numbered frame in which the signal potential is negative is larger (see FIG. 10). Furthermore, also when two differences are compared, i.e., when the difference between the potential of the retention capacitor wire CSLn and the High level when the transistor Tn+2 is turned off in an even-numbered frame is compared with the difference between the potential of the retention capacitor wire CSLn and the Low level when the transistor Tn+2 is turned off in an odd-numbered frame, the difference in the even-numbered frame in which the signal potential is negative is larger (see FIG. 11).

Figure 11:
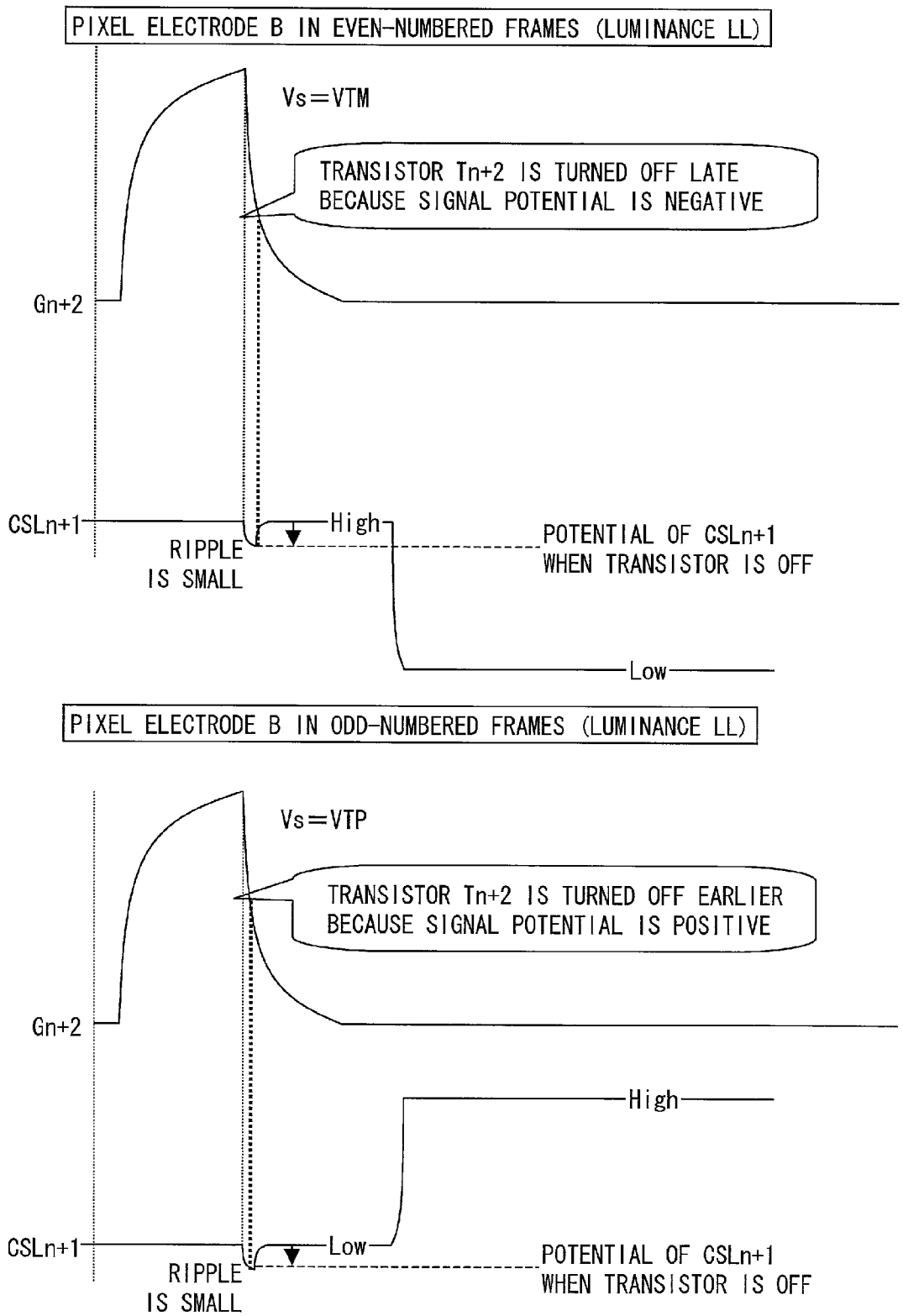
FIG. 11 is a set of timing charts each showing a relationship between (i) the signal potential Vs which is written to the pixel electrode B in an even-numbered frame and (ii) the signal potential Vs which is written to the pixel electrode B in an odd-numbered frame in FIG. 1.

Note, here, that (the difference in an odd-numbered frame—the difference in an even-numbered frame) in the former in which a ripple is large (see FIG. 10) is larger than (the difference in an even-numbered frame—the difference in an odd-numbered frame) in the latter in which a ripple is small (see FIG. 11). Accordingly, for example, if the signal potentials are set such that "a difference between positive and negative signal potentials for the pixel electrode A (positive signal potential−negative signal potential)=a difference between positive and negative signal potentials for the pixel electrode B (positive signal potential−negative signal potential)", transverse lines of display unevenness are likely to occur. Such display unevenness is conspicuous when a low luminance corresponding to a gray level of about 0 to 90 of the 256 gray levels is displayed (luminance of dark subpixels is substantially 0) in pixels.

In view of the circumstances, according to Example 1, signal potentials are set such that "the difference between positive and negative signal potentials for the pixel electrode A (VTp−VTm)">"the difference between positive and negative signal potentials for the pixel electrode B (VTP−VTM)" in the case where the luminance LL (low luminance corresponding to a gray level of about 0 to 90 of the 256 gray levels) is displayed in pixels (see FIGS. 1, 7, 9, 10 and 11). This compensates for the difference between the effect of a ripple which occurs in the retention capacitor wire CSLn and the effect of a ripple which occurs in the retention capacitor wire CSLn+1, and achieves substantially the same effective voltages across the subpixel corresponding to the pixel electrode A and across the subpixel corresponding to the pixel electrode B. This makes it possible to suppress transverse lines of display unevenness. Note that the difference between positive and negative signal potentials (VTp−VTm) for the pixel electrode A corresponds to luminance of γ1 in FIG. 8, and the difference between positive and negative signal potentials (VTP−VTM) for the pixel electrode B corresponds to luminance of γ2 in FIG. 8.

FIG. 12 is a graph showing a relationship between gray levels and degrees of transverse lines of unevenness for each amplitude (amplitude of a modulated signal) of a potential of a retention capacitor wire. It is preferable that signal potentials are set as shown FIG. 1 particularly in a gray level range (gray levels 10 to 64) where the degree of transverse lines of unevenness is 3 and 4.

According to Example 1, γ is set by digital gray level selection which is realized with the use of four LUTs, i.e., 2 (two types of polarity arrangements for dots in a check pattern)×2 (positive and negative signal polarities which are reversed dot by dot).

Figure 13:
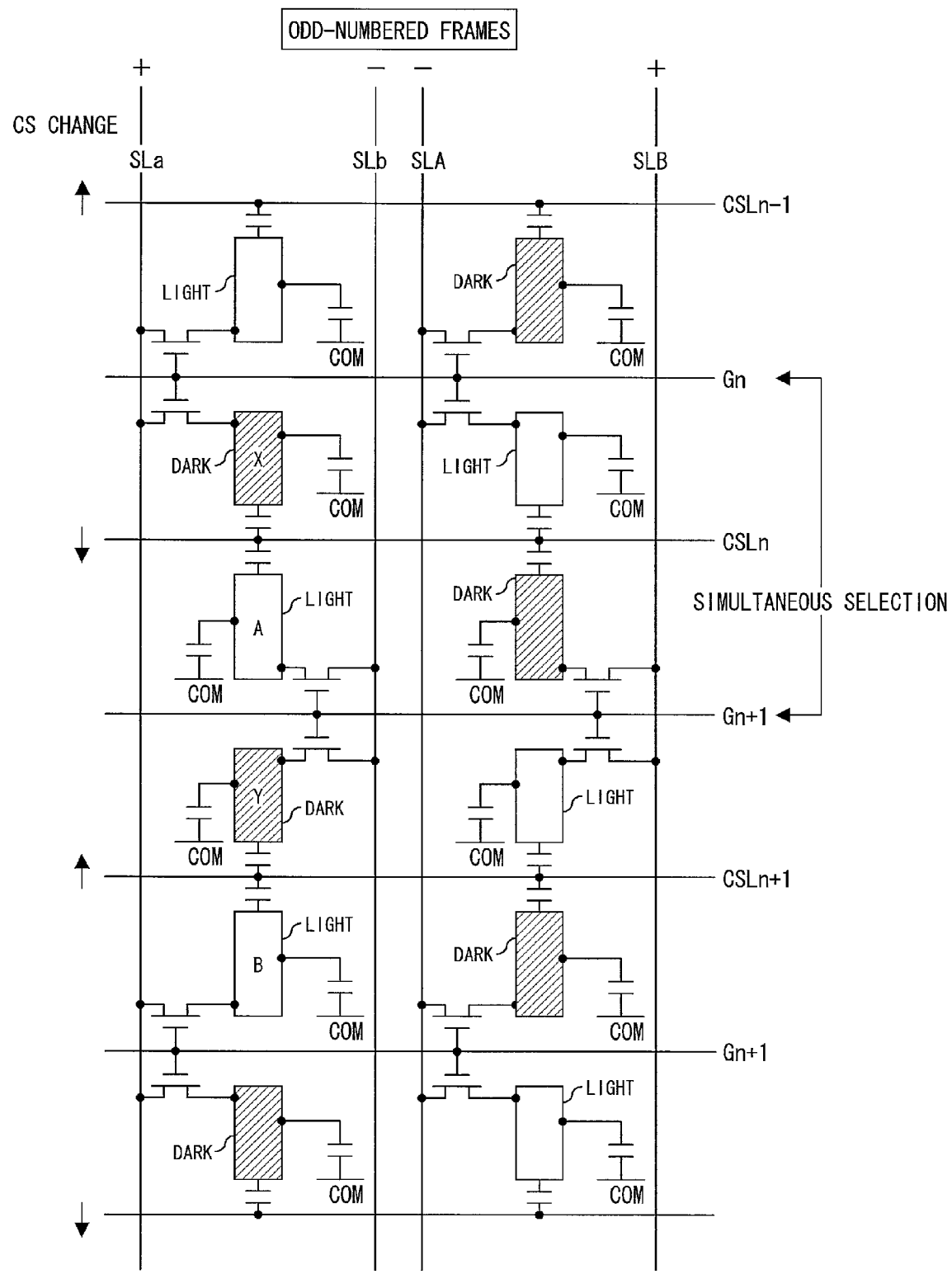
FIG. 13 is a schematic view illustrating an arrangement of two adjacent pixel columns and how to drive them (odd-numbered frames) in Example 1.
Figure 14:
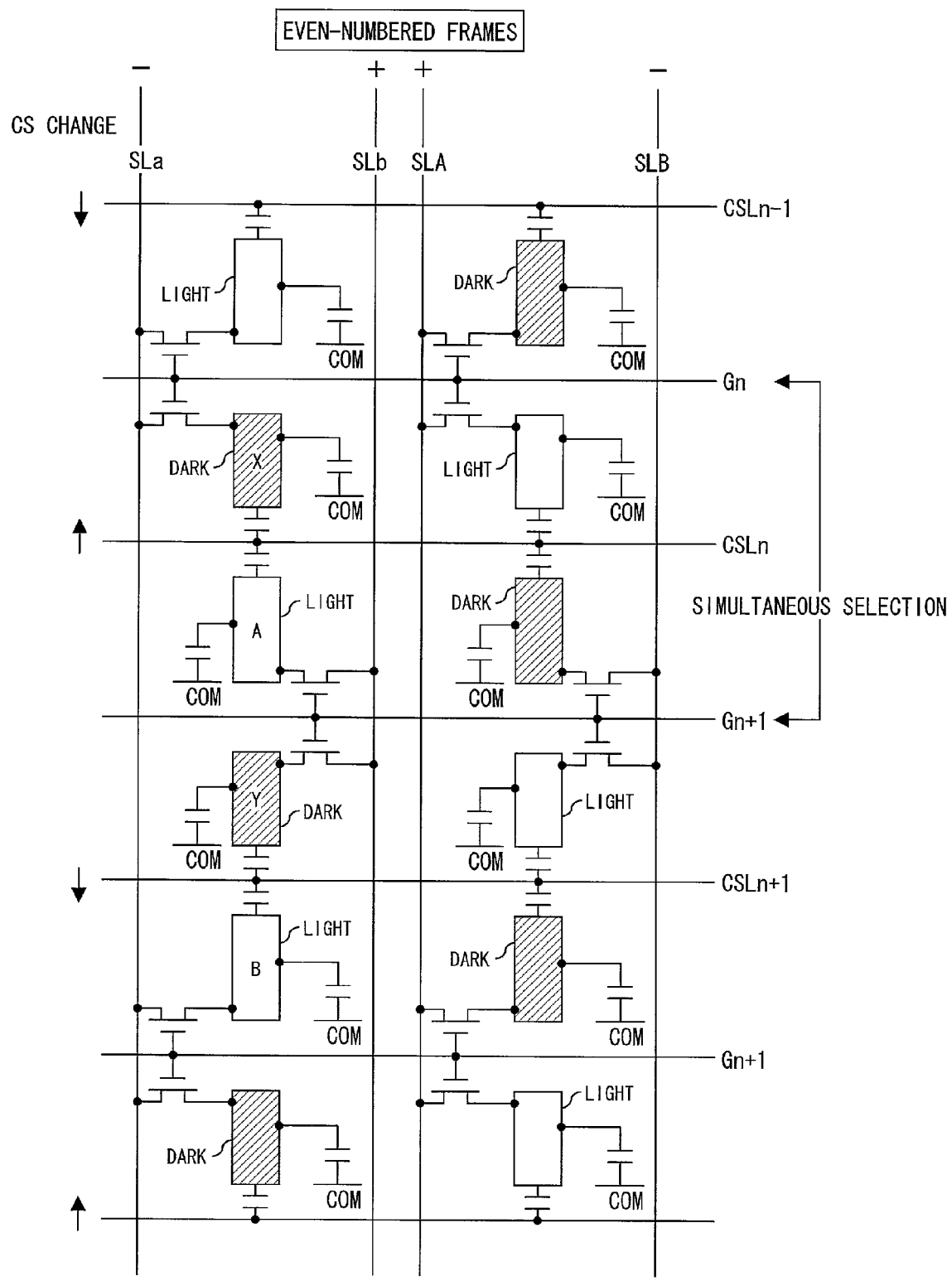
FIG. 14 is a schematic view illustrating an arrangement of two adjacent pixel columns and how to drive them (even-numbered frames) in Example 1.

Example 1 employs, as illustrated in FIGS. 13 and 14, an arrangement in which (i) data signal lines SLa, SLb, SLA, and SLB are arranged in this order and (ii) in a case where one of two pixels adjacent to each other along a row direction is connected to the data signal line SLa via two transistors, the other is connected to the data signal line SLA via two transistors, and, in a case where one of two pixels adjacent to each other along the row direction is connected to the data signal line SLb via two transistors, the other is connected to the data signal line SLB via two transistors. The data signal lines SLa, SLb, SLA, and SLB are supplied with positive, negative, negative, and positive signal potentials, respectively (see FIG. 13), or negative, positive, positive, and negative signal potentials, respectively (see FIG. 14).

Example 2

Figure 15:
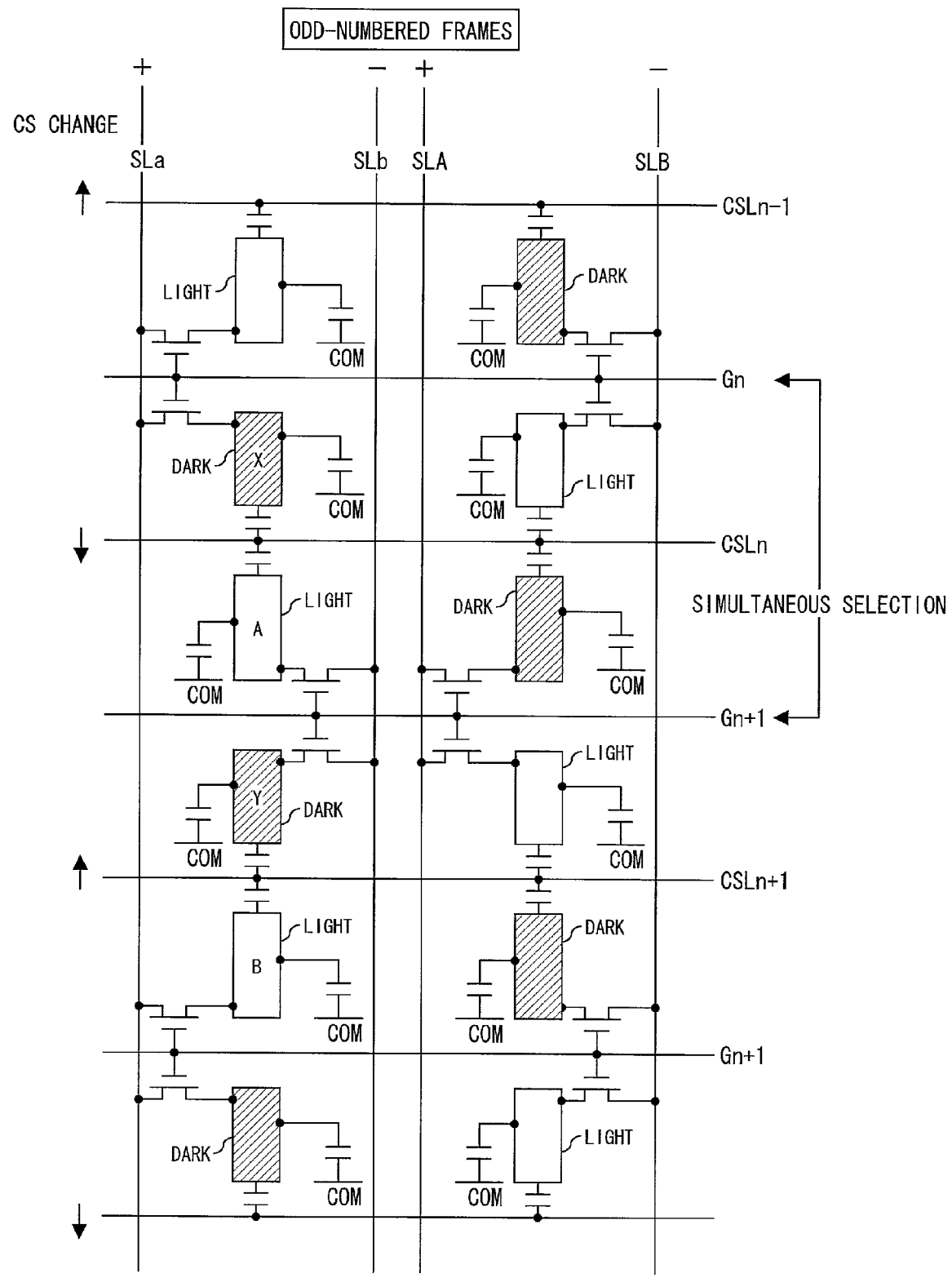
FIG. 15 is a schematic view illustrating an arrangement of two adjacent pixel columns and how to drive them (odd-numbered frames) in Example 2.
Figure 16:
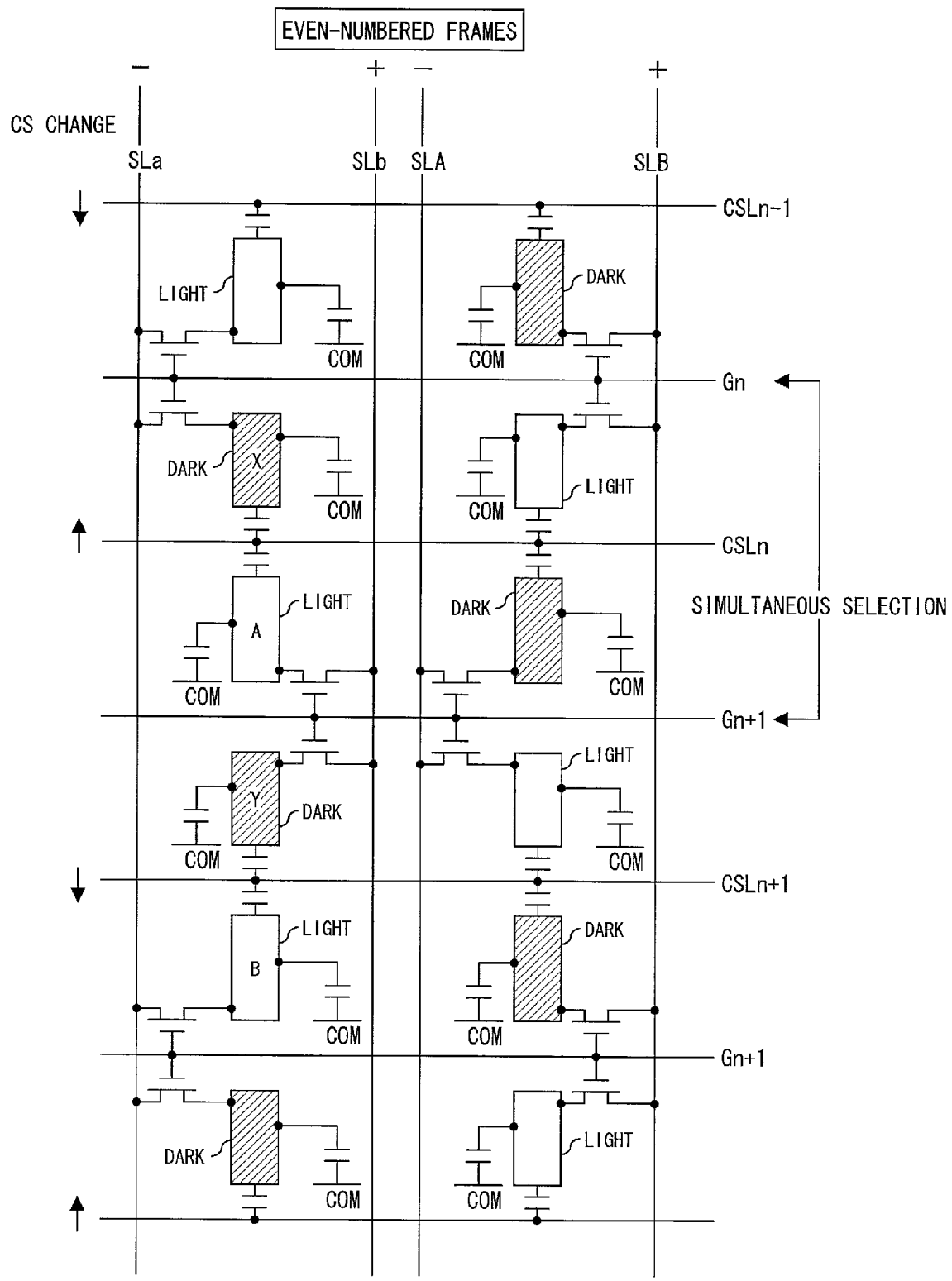
FIG. 16 is a schematic view illustrating an arrangement of two adjacent pixel columns and how to drive them (even-numbered frames) in Example 2.

Example 1 employs, as illustrated in FIGS. 15 and 16, an arrangement in which (i) data signal lines SLa, SLb, SLA, and SLB are arranged in this order and (ii) in a case where one of two pixels adjacent to each other along a row direction is connected to the data signal line SLa via two transistors, the other is connected to the data signal line SLB via two transistors, and, in a case where one of two pixels adjacent to each other along the row direction is connected to the data signal line SLb via two transistors, the other is connected to the data signal line SLA via two transistors. The data signal lines SLa, SLb, SLA, and SLB are supplied with positive, negative, positive, and negative signal potentials, respectively (see FIG. 15), or negative, positive, negative, and positive signal potentials, respectively (see FIG. 16).

Example 3

Figure 17:
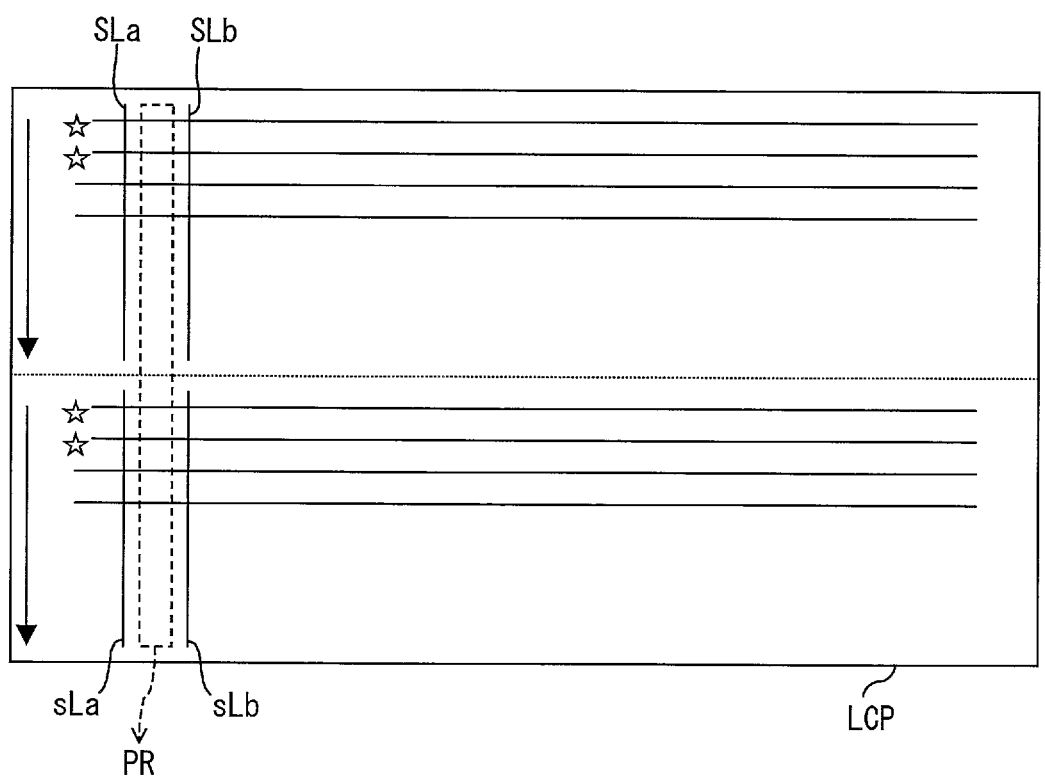
FIG. 17 is a schematic view illustrating how a liquid crystal display device of Example 3 is scanned.

According to Example 3, a first half of the liquid crystal panel which is more upstream along the scanning direction and a second half which is more downstream along the scanning direction are scanned in parallel with each other. Specifically, as shown in FIG. 17, four data signal lines (e.g., data signal lines SLa, SLb, sLa and sLb) are provided for one pixel column, and two scanning signal lines in the first half and two scanning signal lines in the second half (four scanning signal lines in total) are simultaneously scanned. With this configuration, it is possible to perform more high-speed driving.

As has been described, a liquid crystal display device of the present invention is a liquid crystal display device including: a first scanning signal line, a second scanning signal line, a third scanning signal line, and a fourth scanning signal line which are arranged in order; a first pixel, a second pixel, a third pixel, and a fourth pixel connected to the first scanning signal line, the second scanning signal line, the third scanning signal line, and the fourth scanning signal line, respectively; and a first retention capacitor wire and a second retention capacitor wire, wherein the first to fourth pixels each include a plurality of pixel electrodes, the first and second pixels with the first retention capacitor wire form capacitors, and the second and third pixels with the second retention capacitor wire form capacitors, the first and second scanning signal lines are simultaneously selected and thereafter the third and fourth scanning signal lines are simultaneously selected, potentials of the first and second retention capacitor wires are separately controlled, the second pixel and the third pixel have the same color, and in a case where the second and third pixels are to have an identical predetermined luminance in two frames, a first signal potential is written to the second pixel in one of the two frames and a second signal potential having a polarity identical to that of the first signal potential is written to the third pixel in the other of the two frames, the first and second signal potentials being different from each other.

With this arrangement, signal potentials written to pixels compensate for a difference between the degrees of ripples which occur in the first and second retention capacitor wires. Accordingly, it is possible to suppress transverse lines of display unevenness.

The liquid crystal display device of the present invention can also be configured such that the first signal potential is smaller than the second signal potential.

The liquid crystal display device of the present invention can also be configured such that: a third signal potential is written to the third pixel in said one of the two frames; a fourth signal potential having a polarity identical to that of the third signal potential is written to the second pixel in said other of the two frames; and (i) an absolute value of a difference between the first signal potential and the fourth signal potential and (ii) an absolute value of a difference between the second signal potential and the third signal potential are different from each other.

The liquid crystal display device of the present invention can also be configured such that the absolute value of the difference between the first signal potential and the fourth signal potential is larger than the absolute value of the difference between the second signal potential and the third signal potential.

The liquid crystal display device of the present invention can also be configured such that, the predetermined luminance corresponds to a gray level included in a lower half of all gray levels.

The liquid crystal display device of the present invention can also be configured such that, in a case where the number of the all gray levels is 256, the predetermined luminance corresponds to any one of gray levels 5 to 80.

The liquid crystal display device of the present invention can also be configured such that: a potential of each of the first and second retention capacitor wires periodically switches between two levels; and the first changes in potentials of the first and second retention capacitor wires after the simultaneous selection of the first and second scanning signal lines are opposite to each other.

The liquid crystal display device of the present invention can further include: a first data signal line and a second data signal line; and a first transistor, a second transistor, a third transistor, a fourth transistor, a fifth transistor, and a sixth transistor, and can be configured such that: the first pixel includes a first pixel electrode and a second pixel electrode, the second pixel includes a third pixel electrode and a fourth pixel electrode, and the third pixel includes a fifth pixel electrode and a sixth pixel electrode; the first pixel electrode is connected to the first scanning signal line and the first data signal line via the first transistor, and the second pixel electrode is connected to the first scanning signal line and the first data signal line via the second transistor; the third pixel electrode is connected to the second scanning signal line and the second data signal line via the third transistor, and the fourth pixel electrode is connected to the second scanning signal line and the second data signal line via the fourth transistor; the fifth pixel electrode is connected to the third scanning signal line and the first data signal line via the fifth transistor, and the sixth pixel electrode is connected to the third scanning signal line and the first data signal line via the sixth transistor; and the first retention capacitor wire with the second and third pixel electrodes forms capacitors, and the second retention capacitor wire with the fourth and fifth pixel electrodes forms capacitors.

The liquid crystal display device of the present invention can also be configured such that, in one horizontal scanning period, a polarity of a signal potential supplied from the first data signal line and a polarity of a signal potential supplied from the second data signal line are different from each other.

A method for driving a liquid crystal panel in accordance with the present invention is a method for driving a liquid crystal panel including: a first scanning signal line, a second scanning signal line, a third scanning signal line, and a fourth scanning signal line which are arranged in order; a first pixel, a second pixel, a third pixel, and a fourth pixel connected to the first scanning signal line, the second scanning signal line, the third scanning signal line, and the fourth scanning signal line, respectively; and a first retention capacitor wire and a second retention capacitor wire, the first to fourth pixels each including a plurality of pixel electrodes, the first and second pixels with the first retention capacitor wire forming capacitors, the second and third pixels with the second retention capacitor wire forming capacitors, and the second and third pixels having the same color, said method including: simultaneously selecting the first and second scanning signal lines and thereafter simultaneously selecting the third and fourth scanning signal lines; separately controlling potentials of the first and second retention capacitor wires; and in a case where the second and third pixels are to have an identical predetermined luminance in two frames, writing a first signal potential to the second pixel in one of the two frames and writing a second signal potential having a polarity identical to that of the first signal potential to the third pixel in the other of the two frames, the first and second signal potentials being different from each other.

The present invention is not limited to the descriptions of embodiments above, but may be altered by a skilled person within the scope of the claims. An embodiment based on a common general technical knowledge or a proper combination of such embodiments is encompassed in embodiments of the present invention.

INDUSTRIAL APPLICABILITY

The present invention is suitable for a liquid crystal TV and a liquid crystal display.

REFERENCE SIGNS LIST

Pn to Pn+2 Pixels
CSLn to CSLn+2 Retention capacitor wires
Gn to Gn+2 Scanning signal lines
VTm Signal potential (negative, first signal potential)
VTp Signal potential (positive, fourth signal potential)
VTM Signal potential (negative, second signal potential)
VTP Signal potential (positive, third signal potential)
Tn to Tn+2 Transistors
tn+2 Transistors
LCD Liquid crystal display device
LCP Liquid crystal panel

The invention claimed is:

1. A liquid crystal display device comprising:
a first scanning signal line, a second scanning signal line, a third scanning signal line, and a fourth scanning signal line which are arranged in order;
a first pixel, a second pixel, a third pixel, and a fourth pixel connected to the first scanning signal line, the second scanning signal line, the third scanning signal line, and the fourth scanning signal line, respectively; and
a first retention capacitor wire and a second retention capacitor wire, wherein
the first to fourth pixels each include a plurality of pixel electrodes,
the first and second pixels with the first retention capacitor wire form capacitors, and the second and third pixels with the second retention capacitor wire form capacitors,
the first and second scanning signal lines are simultaneously selected and thereafter the third and fourth scanning signal lines are simultaneously selected,
potentials of the first and second retention capacitor wires are separately controlled,
the second pixel and the third pixel have the same color, and
in a case where the second and third pixels are to have an identical predetermined luminance in two frames, a first signal potential is written to the second pixel in one of the two frames and a second signal potential having a polarity identical to that of the first signal potential is written to the third pixel in the other of the two frames, the first and second signal potentials being different from each other.

2. The liquid crystal display device as set forth in claim 1, wherein the first signal potential is smaller than the second signal potential.

3. The liquid crystal display device as set forth in claim 1, wherein:
a third signal potential is written to the third pixel in said one of the two frames;
a fourth signal potential having a polarity identical to that of the third signal potential is written to the second pixel in said other of the two frames; and
(i) an absolute value of a difference between the first signal potential and the fourth signal potential and (ii) an absolute value of a difference between the second signal potential and the third signal potential are different from each other.

4. The liquid crystal display device as set forth in claim 3, wherein the absolute value of the difference between the first signal potential and the fourth signal potential is larger than the absolute value of the difference between the second signal potential and the third signal potential.

5. The liquid crystal display device as set forth in claim 1, wherein, in a case where the number of the all gray levels is 256, the predetermined luminance corresponds to any one of gray levels 5 to 80.

6. The liquid crystal display device as set forth in claim 1, wherein:
- a potential of each of the first and second retention capacitor wires periodically switches between two levels; and
- the first changes in potentials of the first and second retention capacitor wires after the simultaneous selection of the first and second scanning signal lines are opposite to each other.

7. A liquid crystal display device as set forth in claim 1, further comprising: a first data signal line and a second data signal line; and a first transistor, a second transistor, a third transistor, a fourth transistor, a fifth transistor, and a sixth transistor, wherein:
- the first pixel includes a first pixel electrode and a second pixel electrode, the second pixel includes a third pixel electrode and a fourth pixel electrode, and the third pixel includes a fifth pixel electrode and a sixth pixel electrode;
- the first pixel electrode is connected to the first scanning signal line and the first data signal line via the first transistor, and the second pixel electrode is connected to the first scanning signal line and the first data signal line via the second transistor;
- the third pixel electrode is connected to the second scanning signal line and the second data signal line via the third transistor, and the fourth pixel electrode is connected to the second scanning signal line and the second data signal line via the fourth transistor;
- the fifth pixel electrode is connected to the third scanning signal line and the first data signal line via the fifth transistor, and the sixth pixel electrode is connected to the third scanning signal line and the first data signal line via the sixth transistor; and
- the first retention capacitor wire with the second and third pixel electrodes forms capacitors, and the second retention capacitor wire with the fourth and fifth pixel electrodes forms capacitors.

8. The liquid crystal display device as set forth in claim 7, wherein, in one horizontal scanning period, a polarity of a signal potential supplied from the first data signal line and a polarity of a signal potential supplied from the second data signal line are different from each other.

9. The liquid crystal display device as set forth in claim 1, wherein the predetermined luminance corresponds to a gray level included in a lower half of all gray levels.

10. A method for driving a liquid crystal panel, the liquid crystal panel including: a first scanning signal line, a second scanning signal line, a third scanning signal line, and a fourth scanning signal line which are arranged in order; a first pixel, a second pixel, a third pixel, and a fourth pixel connected to the first scanning signal line, the second scanning signal line, the third scanning signal line, and the fourth scanning signal line, respectively; and a first retention capacitor wire and a second retention capacitor wire, the first to fourth pixels each including a plurality of pixel electrodes, the first and second pixels with the first retention capacitor wire forming capacitors, the second and third pixels with the second retention capacitor wire forming capacitors, and the second and third pixels having the same color, said method comprising:
- simultaneously selecting the first and second scanning signal lines and thereafter simultaneously selecting the third and fourth scanning signal lines;
- separately controlling potentials of the first and second retention capacitor wires; and
- in a case where the second and third pixels are to have an identical predetermined luminance in two frames, writing a first signal potential to the second pixel in one of the two frames and writing a second signal potential having a polarity identical to that of the first signal potential to the third pixel in the other of the two frames, the first and second signal potentials being different from each other.

* * * * *